Patented Sept. 8, 1931

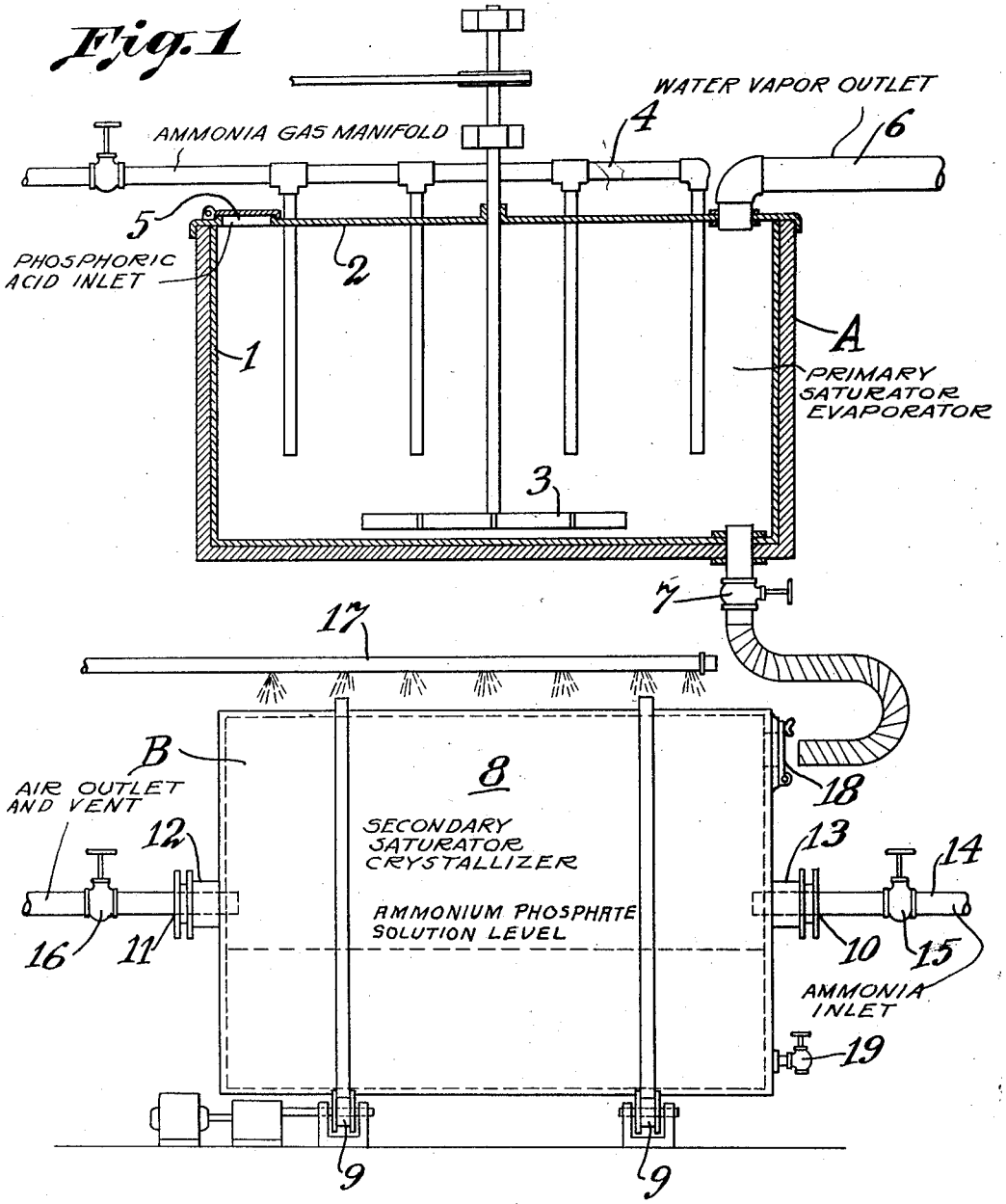

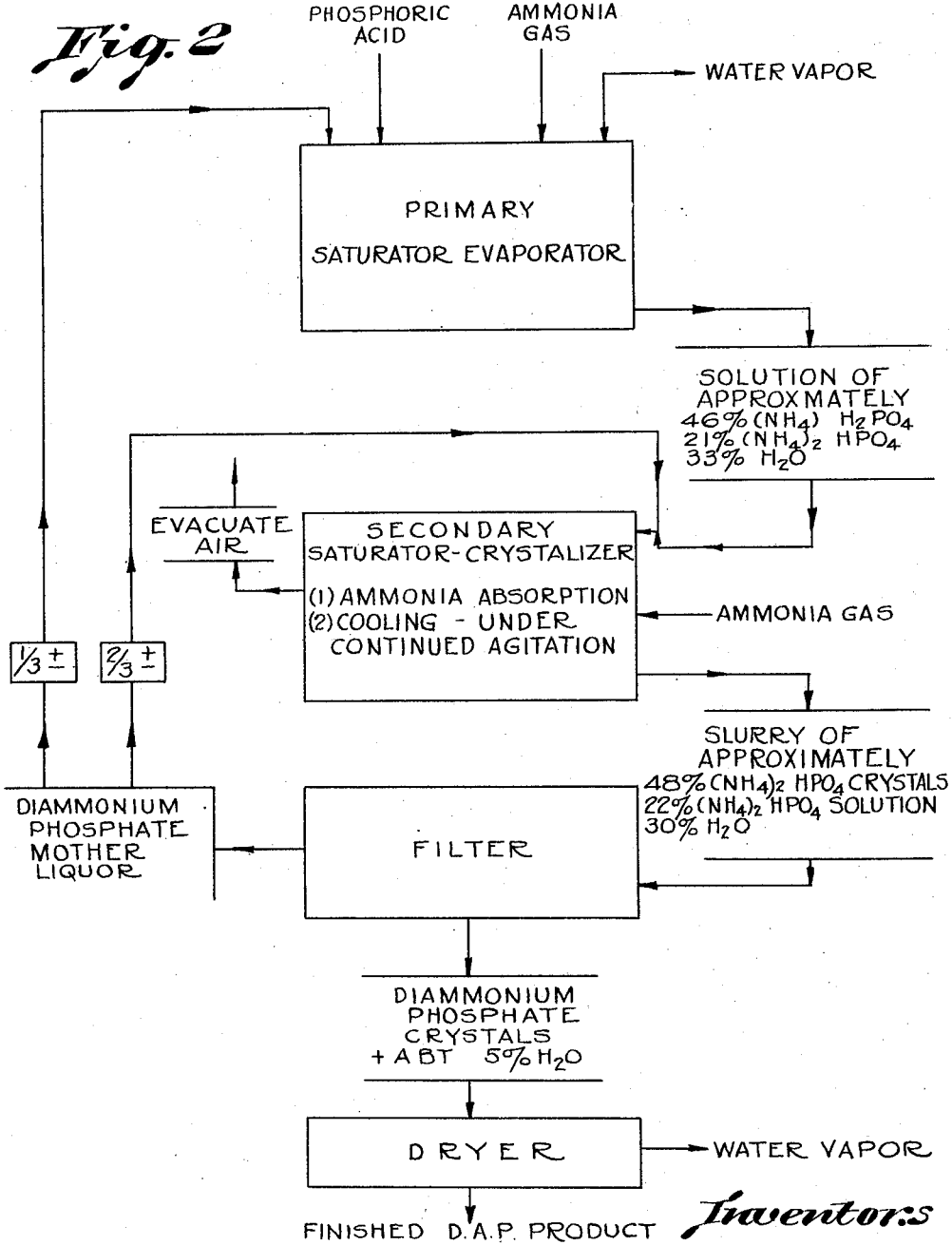

1,822,040

UNITED STATES PATENT OFFICE

BETHUNE G. KLUGH, OF BIRMINGHAM, AND WARREN R. SEYFRIED, OF ANNISTON, ALABAMA, ASSIGNORS, BY MESNE ASSIGNMENTS, TO SWANN RESEARCH, INC., OF BIRMINGHAM, ALABAMA, A CORPORATION OF ALABAMA

PROCESS FOR MANUFACTURE OF DI-AMMONIUM PHOSPHATE

Application filed July 16, 1928. Serial No. 292,979.

This invention relates to a process of producing di-ammonium phosphate and has for its object an improvement over formerly applied processes in the following features:

1. Minimum loss of ammonia during the process.
2. Elimination of extraneous heat for evaporation of water from solutions.
3. Production of uniform and predetermined size of crystals free from mono and tri-ammonium phosphate.
4. Employment of concentrated phosphoric acid and anhydrous ammonia to best advantage.
5. Minimum requirement of time, labor and apparatus for completion of process.

These advantages may all be summarized as effecting a lower conversion cost and an improved quality of the product over that heretofore attained.

It is well known that mono-ammonium phosphate decomposes at about 150° C. and di-ammonium phosphate at about 75° C. at normal vapor pressure conditions.

The exothermic heat of the reaction of combination between $NH_3$ and $H_3PO_4$ in the formation of $(NH_4)H_2PO_4$ and of $(NH_4)_2HPO_4$ is of sufficient calorific magnitude to evaporate large proportions of water from the solution. The practical utilization of this heat of reaction must be made through application at the stage of neutralization at which the temperature is slightly above the boiling point of the solution, and at the same time below the decomposition point of the salt in the solution. This is necessary to actually evaporate the water without loss of ammonia. It is furthermore necessary to perform this neutralization in well insulated vessels, so as to apply the heat of reaction to the heating of the solution with minimum radiation and conduction losses thereof.

We have found that the necessary stability of the ammonia and phosphoric acid compounds which exist for best evaporating conditions is at about a ratio of 85% mono-ammonium phosphate to 15% di-ammonium phosphate. It is advantageous to have the solution just as concentrated as will permit thorough agitation for introduction and most rapid absorption of ammonia. If the solution is too concentrated the high viscosity prevents bringing new surfaces into contact with the incoming stream of ammonia, so that a portion of it will channel through the solution without combining and thus will be lost. If, on the other hand, the solution is too dilute there will be too much of the heat of the reaction absorbed in raising the temperature of the excess water so that the final temperature and available exothermic heat will be insufficient to perform any effective evaporation.

It is furthermore obvious that in the production of di-ammonium phosphate from concentrated ammonia and phosphoric acid by finally crystallizing the salt out of solution, the ideal procedure will be with the circulating mother liquor maintained at a constant volume and concentration. It is also obvious that the water brought into the system with the $H_3PO_4$ represents that quantity requiring evaporation in order to maintain the circulating mother liquor constant.

Following the step of neutralizing the phosphoric acid with ammonia to the stage required for practically evaporating the excess water with the heat of reaction, the further combination of ammonia to the di-ammonium phosphate state presents, in former practice, great difficulty in respect to prevention of ammonia losses, time of neutralization and of proper concentration and cooling of the solution for obtaining a maximum yield of uniformly sized crystals in the final product. We have accomplished in our invention optimum results in all these features and characteristics so that they may be all carried out in a simple form of apparatus and in addition, we have found that we can control the size, as well as the uniformity, of the crystals.

In former procedure many hours were required to neutralize a large volume of mono-ammonium phosphate solution up to di-ammonium phosphate by addition of ammonia gas, due to the necessity of maintaining the solution in the process at a temperature sufficiently low to avoid ammonia escaping therethrough. In our process we are enabled to complete the neutralization in large volume unit operations to di-ammonium phosphate in a much lesser time and with substantially no ammonia loss, and also to have final concentration and temperature conditions of the solution from which substantially all of the salt crystallized therefrom will be of uniform size and, furthermore, the size of the crystals may be controlled.

These features of uniformity and control of size are highly desirable from the standpoint of distribution over land when used as a fertilizer or for providing a salt adapted for making up intimate mixtures for any purposes. Having outlined the functional and fundamental features of our process, we will now describe in detail our complete procedure by which any one skilled in the art will be enabled to practice it.

Our process contemplates the use of phosphoric acid of 60 to 80% $H_3PO_4$ content, depending on the size crystals desired, and with concentrated ammonia gas. In order to more comprehensively describe our process we present as an example a typical case of 80% $H_3PO_4$ acid and anhydrous ammonia as raw materials. We furthermore use in this example a basic figure of 1,000 lbs. of finished dry di-ammonium phosphate crystals as a basis for proportions of components at various stages of operation of our invention.

In the accompanying drawings forming a part of this application,

Fig. 1 shows a schematic arrangement of the preferred form of apparatus we employ; and Fig. 2 is a flow sheet illustrating the carrying out of our invention.

Referring to the drawings showing schematic arrangement of the preferred form of apparatus we employ, the first step of the operation of our process is conducted in the primary or stationary saturator-evaporator A, consisting of a vertically disposed tank having acid proof insulated walls and bottom 1, with closed roof 2, provided with agitating stirrer 3 with shaft projected through the roof and driven by any suitable means, having also manifold ammonia piping 4 from a necessary pressure source, also a solution inlet 5 and vapor outlet 6, and discharge valve 7.

The second step is conducted in the secondary or rotary-saturator crystallizer B, consisting of a closed cylinder 8 mounted on ring rollers or trunions 9. The cylinder 8 has central openings 10 and 11 each provided with stuffing box seals 12 and 13. An ammonia feed pipe 14 with valve control 15 is connected to the opening 10. The opposite opening is connected with a suction apparatus for purposes later described. A water spray pipe 17 arranged above the cylinder 8, provides means of cooling the solution. A discharge and feed gate 18 is provided on the end of the cylinder.

On the aforesaid basis of 1,000 lbs. of finished di-ammonium phosphate dry crystals desired we proceed as follows.

As will be shown below the nominal amount of mother liquor maintained in the circuit per 1,000 lbs. of finished product is 955 lbs. containing about 404 lbs. di-ammonium phosphate in solution with 551 lbs. water.

We first add to the primary vessel A, through opening 5, 353 lbs. of di-ammonium phosphate mother liquor solution and to this 926 lbs. of 80% $H_3PO_4$ acid. The stirrer 3 is put in operation and ammonia gas fed in gradually through manifold pipes 4. By this means the acid readily absorbs the ammonia, and the heat of reaction raises the temperature rapidly. The addition of di-ammonium phosphate liquor is for the two fold purpose of providing a solution of proper viscosity for adequate agitation to provide rapid and complete combination of the ammonia, and also to limit the amount of solution present to absorb the heat of reaction, thereby conserving all possible heat action, thereby to apply to the evaporation function. By following this procedure as outlined the temperature of this solution is raised and accelerated sufficiently by the agitation to evaporate the excess of water, which passes as vapor out of the vent pipe 6.

After about 129 lbs. of $NH_3$ have been passed into the solution, as measured by meters or by titration of a sample of the solution, the stream of $NH_3$ is cut off and stirring continued until the required amount of water is evaporated as determined by specific gravity of the solution or by other convenient means. This desired amount of water to be removed by evaporation is about 134 lbs.

While the water brought in with 926 lbs. of 80% $H_3PO_4$ amounts to 185 lbs., we require at this stage in the evaporation that only 134 lbs. be removed. The 51 lbs. remaining is that amount that will be evaporated in the drying of the final crystals, as the primary dewatering will leave about 5% of surface moisture with the crystals.

After this evaporation the solution contains a ratio of about

|   |   | Per cent |
|---|---|---|
| 870 lbs. mono-ammonium phosphate | | 68 |
| 148 lbs. di-ammonium phosphate | | 12 |
| 256 lbs. water | | 20 |
| 1,274 lbs. | | 100 |

The above described solution is then discharged from the primary saturator A and the second addition of di-ammonium phosphate mother liquor to the amount of about 602 lbs. is then added to this solution either directly into the secondary saturator or in an intermediate vessel.

The purpose of this two-stage addition of the mother liquor is to control the concentration and thereby the fluidity and also the temperature just described.

It is essential to maintain the temperature resulting from the heat of the reaction as high as possible in the primary vessel A to conserve it for subsequent evaporations in the cycle of operations. The solution now contains about

|  | | Per cent |
|---|---|---|
| 870 lbs. | mono-ammonium phosphate | 46.3 |
| 401 lbs. | di-ammonium phosphate | 21.5 |
| 605 lbs. | water | 32.2 |
| 1,876 lbs. | | 100 |

In the the second stage of operation the above described solution is transferred to the secondary vessel B through outlet valve 7 and hose connection. The cylinder 8, having received the hot solution from the first step, is closed tightly at 18 and at ammonia valve 15. The air within the space in the cylinder is then exhausted either by pumping a vacuum therein through valve 16 from suitable apparatus, or by filling the cylinder with steam. This air may also be exhausted by diluting with ammonia through feed valve 15, and passing out a portion of the ammonia through valve 16 to absorption apparatus.

This feature is an important one in the successful application of our invention. We have found the absorption rate of the $NH_3$ is greatly increased by the provision of a saturated ammonia atmosphere above the solution, but also that the absorption up to the stage of $(NH_4)_2HPO_4$ may be done at temperatures above 80° C. under such condition. With an atmosphere of air above the solution considerable volume of ammonia will pass through the saturator without combination.

The solution in the cylinder must have its level below the center for the reason that, should the ammonia be led into the solution as it approaches the di-ammonium phosphate stage, a submerged pipe or other gas conducting appliance would fill up with ammonium phosphate crystals, causing the operation to be interrupted at a critical stage. We therefore introduce the ammonia in this step over the solution, and present continuously new surfaces thereof to the reacting $NH_3$ gas by revolving the cylinder. The cylinder, while revolving, takes portions of the solution up with it along its sides and permits it to fall back through the atmosphere of ammonia into the body of the solution.

We have furthermore found that when any air remains above the solution of the ammonium phosphate more acid than that of di-ammonium phosphate, the gaseous $NH_3$ fed in for combination with this solution will tend to combine more rapidly with the solution nearest the $NH_3$ inlet in which case a portion of the solution will actually be combined to higher $NH_3$ content than that of the di-ammonium state. We have found that this condition defeats the object of producing uniformly sized crystals of di-ammonium phosphate. This is evidently due to the fact that any tri-ammonium phosphate formed in the solution of di-ammonium phosphate will, on account of its much lower solubility, crystallize out and act as an inhibitor in the uniform growth of the di-ammonium phosphate crystals, after complete neutralization to this stage and cooling for controlled crystallization. The prevention of this phenomena which we have discovered, is furthermore the object of this method of introducing the ammonia for the secondary addition by means of a saturated atmosphere above the renewed surfaces of the solution. With the discovery of this phenomena it becomes obvious that the introduction of the $NH_3$ into the solution through pipes below its surface will cause the premature combination of $NH_3$ therewith to a tri-ammonium stage, in segregated sections of the solution with disadvantages above described.

The solution heats up from the reaction to about 100° C. and it is necessary to cool it gradually down to about 80° C. as the di-ammonium phosphate stage is approached. When the required ammonia has been fed into the revolving cylinder, as determined by the metered gas or by titration, a sample being taken through a pet-cock 19, the ammonia supply is cut off and the revolving of the cylinder continued. The cylinder is then vented slightly through valve 16 to allow air to replace the absorbed ammonia.

We have found that it is important to control the ammonia addition so as not to pass the di-ammonium stage, either in any portion of the reacting solution or in its entirety. If any tri-ammonium phosphate is formed, it will cause the di-ammonium phosphate crystals to become irregular in size and break down the uniformity and size of crystals desired. Furthermore it is vital that the solution be held at about 80° C. at the completion of the neutralization to di-ammonium phosphate in order to have complete solution and to prevent the formation of tri-ammonium phosphate. Any crystals precipitated out before the gradual cooling stage is begun will strongly influence the physical state of subsequent crystals made and destroy the desired uniformity and size of the crystals.

With the ammonia cut off and the cylinder vented, the revolving is continued with gradual cooling at a rate of about 10° C. per hour until the solution is down to the temperature of the surrounding atmosphere.

This is another important feature, because in order to obtain a uniform crystal size the solution must be thoroughly agitated during cooling which is accomplished with the revolving action described, and which gives substantially each and every crystal the same time of contact with the solution in which it grows. If the slurry is discharged and cooled later at rest the secondary growth of crystals will result in irregular aggregates and fines which destroy the uniformity of the crystals.

After cooling the solution as above described the contents of the cylinder are discharged through discharge door 18 into a receiving tank.

The solution after the addition of the 129 lbs. of $NH_3$ in the second stage contains about

|  | Per cent |
|---|---|
| 1,400 lbs. di-ammonium phosphate | 70 |
| 600 lbs. water | 30 |
| 2,000 lbs. | 100 |

After cooling to 30° C. the redistribution will be about

|  | Per cent |
|---|---|
| 965 lbs. di-ammonium phosphate crystals | 48 |
| 435 lbs. di-ammonium phosphate in solution | 22 |
| 600 lbs. water | 30 |
| 2,000 lbs. | 100 |

After dewatering the crystals, there will be left about 5% as surface moisture with the crystals, which water being as a saturated solution of di-ammonium phosphate will carry 37 lbs. of $(NH_4)_2HPO_4$ with the 51 lbs. $H_2O$. This leaves as mother liquor 955 lbs. of about 42% di-ammonium phosphate for the circuit hereinabove mentioned.

The slurry of crystals and mother liquor is kept in agitation until passed to a filter or centrifuge, acting continuously or intermittently, for primary dewatering. This is to prevent settling and aggregating of the crystals. After dewatering to about 5% $H_2O$ the crystals are conveyed immediately to a dryer in which the remainder of the surface moisture is evaporated, maintaining the crystals at a temperature below 65° C. preferably in a continuous rotary drier.

The crystals are then of uniform, desired, size and regular shape adapted to accurate mixing or distribution.

It will be noted that the final solution of the secondary saturator before cooling contains about 70% di-ammonium phosphate with 30% water. This may be varied slightly, but we have found this concentration provides a solution adapted to best crystallizing conditions with a minimum quantity of mother liquor resulting from the circuit in the cycle of operations.

In the example of operation heretofore described, we have set forth the production of di-ammonium phosphate by the use of 80% $H_3PO_4$ and anhydrous concentrated ammonia. We have found, however, that the size of crystals produced may be varied by varying the strength of the $H_3PO_4$ employed in the process, the weaker the phosphoric acid, within the limits given, the smaller the size of the crystals produced.

What we claim is:

1. A process of producing di-ammonium phosphate consisting of first producing a solution of about 68% mono-ammonium phosphate and 12% di-ammonium phosphate, excluding air from contact with the solution, providing an atmosphere of saturated ammonia above said solution, subjecting the solution to agitation in a manner to present new portions thereof continuously to said atmosphere, and supplying ammonia above the solution up to the amount required to produce di-ammonium phosphate.

2. A process of producing di-ammonium phosphate consisting of first producing a solution of about 68% mono-ammonium phosphate and 12% di-ammonium phosphate, excluding air from the solution, providing an atmosphere of saturated ammonia above said solution, agitating the solution in a manner to contact continuously fresh portions thereof to said ammonia atmosphere, supplying ammonia gas above the solution up to the amount required to produce di-ammonium phosphate, and continuing the agitation until all of said ammonia is absorbed.

3. A process according to claim 2, in which the revolving of the cylinder is continued until the contents are cooled to atmospheric temperature.

4. A process according to claim 2, in which the revolving of the cylinder is continued until the contents are cooled to atmospheric temperature, and the cooling is maintained at a rate of approximately 10° C. per hour.

5. A process according to claim 2 in which the temperature of neutralization of the solution is maintained above 80° C. until the di-ammonium stage has been reached.

6. A process according to claim 2 in which the temperature of neutralization of the solution is maintained above 80° C. until the di-ammonium stage has been reached and in which the product is maintained in agitation until dewatered.

7. The herein described process consisting of adding di-ammonium phosphate mother liquor to concentrated phosphoric acid in sufficient quantity to maintain free fluidity thereof, agitating the solution, and feeding ammonia gas thereinto at the maximum rate of absorption into the solution, until combined in proportion of about 5½ parts mono-ammonium to one part di-ammonium phosphate, thereby evaporating by the heat of the reaction substantially all the water combined with the phosphoric acid.

8. A process according to claim 7 in which the initial solutions are in ratio of approximately 350 lbs. of 42% aqueous solution of di-ammonium phosphate to 740 lbs. of $H_3PO_4$ in solution more concentrated than 60%.

9. A process consisting of that described in claim 7 followed by addition of 42% di-ammonium phosphate solution sufficient to bring the combined solutions to the proportions of approximately 46% mono-ammonium to 22% di-ammonium phosphate, agitating the solution, and feeding ammonia gas over the surface thereof.

10. The herein described process consisting of adding di-ammonium phosphate mother liquor to concentrated phosphoric acid in sufficient quantity to maintain fluidity thereof, agitating the solution, feeding ammonia gas thereinto at the maximum rate of absorption into the solution until combined in proportions of about 5½ parts mono-ammonium to one part di-ammonium phosphate, thereby evaporating by the heat of reaction substantially all the water in the phosphoric acid, adding 42% di-ammonium phosphate solution thereto sufficient to bring the combined solutions to the proportions of approximately 46% mono-ammonium to 22% di-ammonium phosphate, excluding air from contact with the solution, and supplying ammonia gas above the solution up to the amount required to form di-ammonium phosphate while agitating the solution in a manner to bring fresh portions thereof into the atmosphere of ammonia.

11. The herein described process consisting of adding di-ammonium phosphate mother liquor to concentrated phosphoric acid in sufficient quntity to maintain relatively free fluidity thereof, agitating the solution, feeding ammonia gas thereinto at the maximum rate of absorption into the solution until combined in proportions of about 5½ parts mono-ammonium to one part di-ammonium phosphate thereby evaporating by the heat of the reaction substantially all the water in the phosphoric acid, adding 42% di-ammonium phosphate solution sufficient to bring the combined solutions to the proportions of approximately 46% mono-ammonium to 22% di-ammonium phosphate, excluding air from contact with the solution, supplying ammonia gas above the solution up to the amount required to form di-ammonium phosphate while subjecting the solution to agitation bodily in a manner to continuously bring fresh portions thereof into the atmosphere of ammonia, stopping the ammonia feed and continuing the agitation until the balance of the ammonia in said cylinder is absorbed.

12. A process for the production of di-ammonium phosphate which comprises reacting phosphoric acid with ammonia in a solution of di-ammonium phosphate to form a primary solution of predominately mono-ammonium phosphate while utilizing the heat of the reaction to evaporate the water in the phosphoric acid adding a saturated solution of di-ammonium phosphate to the primary solution to form a secondary solution, and subjecting said secondary solution to an atmosphere of ammonia until a solution of di-ammonium phosphate is formed while agitating and cooling the same to hasten further absorption of ammonia.

13. The process of producing di-ammonium phosphate which comprises forming a primary solution by adding phosphoric acid to di-ammonium phosphate mother liquor and reacting ammonia gas therewith to form a pirmary predominately mono-ammonium phosphate solution while utilizing the heat of neutralization to evaporate the water in the phosphoric acid, adding additional di-ammonium phosphate mother liquor to the primary solution to form a secondary solution, and separately neutralizing said secondary solution with ammonia to form a di-ammonium phosphate solution while maintaining the temperature of said secondary solution below 100° C.

14. The process of producing di-ammonium phosphate which comprises forming a primary solution by adding phosphoric acid to di-ammonium phosphate mother liquor and reacting ammonia gas therewith to form a primary predominately mono-ammonium phosphate solution while utilizing the heat of neutralization to evaporate the water in the phosphoric acid, adding additional di-ammonium phosphate mother liquor to the primary solution to form a secondary solution, separately neutralizing said secondary solution with ammonia to form a di-ammonium phosphate solution, crystillizing di-ammonium phosphate out of the solution, and utilizing the mother liquor remaining in forming other primary and secondary solutions.

15. The process of producing di-ammonium phosphate which comprises forming a primary solution by adding phosphoric acid to di-ammonium phosphate mother liquor and reacting ammonia gas therewith to form a primary predominately mono-ammonium phosphate solution while utilizing the heat of neutralization to evaporate water introduced in combination with the phosphoric acid, adding additional di-ammonium phosphate mother liquor to the primary solution to form a secondary solution, separately neutralizing said secondary solution with ammonia while maintaining said solution at a temperature below 100° C. to form a di-ammonium phosphate solution, crystallizing di-ammonium phosphate out of the solution, and utilizing the mother liquor remaining in forming other primary and secondary solutions.

16. A process of producing di-ammonium phosphate comprising producing a primary solution of mono-ammonium phosphate by a reaction between phosphoric acid and ammonia gas and wherein the heat of formation is utilized to evaporate the water introduced in combination with the phosphoric acid, then producing a secondary solution of di-ammonium phosphate by a reaction between ammonia gas and the primary solution while maintaining the temperature of the solution at around 80° C., and separating di-ammonium phosphate crystals from the solution.

17. A process as outlined in claim 16 in which the mother liquor remaining from the di-ammonium phosphate solution is utilized in forming both the primary and the secondary solutions.

18. A process as outlined in claim 16 in which the mother liquor remaining from the di-ammonium phosphate solution is utilized in forming both the primary and the secondary solutions and in which approximately one-third of the mother liquor is used in forming the primary solution to provide requisite fluidity thereof.

19. The steps in the manufacture of di-ammonium phosphate in successive batches, comprising forming a solution of phosphoric acid and not more than one third of the di-ammonium phosphate mother liquor from a previous batch to control fluidity of the solution, neutralizing the phosphoric acid with ammonia gas to form a predominately mono-ammonium phosphate solution and evaporating the water of combination with the phosphoric acid by the heat of formation of the mono-ammonium phosphate.

20. In the manufacture of di-ammonium phosphate in successive batches and in which neutralization of phosphoric acid to the mono-ammonium stage is first carried out followed by neutralization of the mono-ammonium phosphate to di-ammonium phosphate, the steps of using the mother liquor from each batch in the subsequent batch by adding about one-third thereof to the mono-ammonium phosphate neutralization stage, and about two-thirds to the di-ammonium phosphate neutralization stage.

21. In the manufacture of di-ammonium phosphate, in substantially uniform successive batches, the maintaining of substantially constant volume of di-ammonium phosphate mother liquor, through evaporation of the water introduced into the system in combination with phosphoric acid by the heat of formation of mono-ammonium phosphate before di-ammonium phosphate is formed.

22. In the manufacture of di-ammonium phosphate, the steps of juxtaposing a body of ammonium phosphate solution more acid than di-ammonium phosphate and an atmosphere of substantially pure ammonia, projecting successive portions of the said solution into intimate contact with said ammonia atmosphere, returning said successive portions of said solution immediately after said contact into the body of said solution, with intimate mixture therewith to maintain the entire body of said solution in progressively uniform degree of neutralization, maintaining a uniform temperature of about 80° C. until formation of di-ammonium phosphate, then removing the ammonia atmosphere from contact with said solution, and continuing to maintain the entire body of solution in intimately uniform state with progressive cooling down to about 10° C.

23. In the manufacture of di-ammonium phosphate, the steps of juxtaposing a body of ammonium phosphate solution more acid than di-ammonium phosphate and an atmosphere of substantially pure ammonia, projecting successive portions of the said solution into intimate contact with said ammonia atmosphere, returning said successive portions of said solution immediately after said contact into the body of said solution, with intimate mixture therewith to maintain the entire body of said solution in progressively uniform degree of neutralization, maintaining a uniform temperature of about 80° C. until formation of di-ammonium phosphate, then removing the ammonia atmosphere from contact with said solution, continuing to maintain the entire body of solution in intimately uniform state with progressive cooling down to about 10° C., and continuing thorough agitation of the entire body of the solution and formed crystals up to separation of crystals from mother liquor.

In testimony whereof we affix our signatures.

BETHUNE G. KLUGH.
WARREN R. SEYFRIED.